United States Patent
Conley et al.

(10) Patent No.: US 9,127,809 B2
(45) Date of Patent: Sep. 8, 2015

(54) MULTI-CHAMBER PUMP SYSTEM

(75) Inventors: Paul G. Conley, St. Charles, MO (US); Brad Allen Edler, Waterloo, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 617 days.

(21) Appl. No.: 13/451,169

(22) Filed: Apr. 19, 2012

(65) Prior Publication Data

US 2013/0277149 A1    Oct. 24, 2013

(51) Int. Cl.
*F16N 39/00* (2006.01)
*F16N 7/38* (2006.01)

(52) U.S. Cl.
CPC .............. *F16N 39/002* (2013.01); *F16N 39/00* (2013.01)

(58) Field of Classification Search
CPC .............. F16N 7/38; F16N 39/00; F01M 1/02
USPC ....................................................... 184/6.21
See application file for complete search history.

(56) References Cited

U.S. PATENT DOCUMENTS

| | | | |
|---|---|---|---|
| 2,187,684 A | 1/1940 | Fox et al. | |
| 2,627,320 A | 2/1953 | Rotter | |
| 2,636,441 A | 4/1953 | Woelfer | |
| 2,787,225 A | 4/1957 | Rotter | |
| 3,469,532 A | 9/1969 | Wegmann et al. | |
| 3,502,029 A | 3/1970 | Halladay | |
| 3,945,772 A | 3/1976 | Van de Moortele | |
| 4,069,835 A | 1/1978 | Stadler | |
| 4,487,340 A | 12/1984 | Shaffer | |
| 4,718,824 A | 1/1988 | Cholet et al. | |
| 4,762,474 A | 8/1988 | Dartnall | |
| 5,022,556 A | 6/1991 | Dency et al. | |
| 5,611,411 A * | 3/1997 | Reilly, III | 184/6.4 |
| 6,102,676 A | 8/2000 | DiCarlo et al. | |
| 6,161,723 A | 12/2000 | Cline et al. | |
| 6,244,387 B1 | 6/2001 | Paluncic et al. | |
| 6,793,042 B2 * | 9/2004 | Brouillet | 184/6.11 |
| 2002/0157901 A1 | 10/2002 | Kast et al. | |
| 2005/0180870 A1 | 8/2005 | Stanley et al. | |
| 2008/0240944 A1 | 10/2008 | Arens | |

FOREIGN PATENT DOCUMENTS

| | | |
|---|---|---|
| DE | 9412699 U1 | 12/1995 |
| DE | 19623537 A1 | 12/1997 |
| GB | 2205905 A | 12/1988 |

OTHER PUBLICATIONS

International Search Report regarding corresponding PCT/US2013/030464, dated Sep. 27, 2013, 4 pages.

(Continued)

*Primary Examiner* — William E Dondero
*Assistant Examiner* — Mark K Buse
(74) *Attorney, Agent, or Firm* — Senniger Powers LLP (57) ABSTRACT

A lubricant reservoir including a container defining an interior for holding lubricant. The reservoir includes a partition inside the container interior dividing the interior into multiple chambers. Each chamber segregates lubricant from lubricant in every other chamber. The reservoir has multiple outlets. An outlet is positioned in each chamber to permit lubricant to be removed from the corresponding chamber. The reservoir includes multiple motor-driven stirrers. A stirrer is positioned in each chamber to stir lubricant in the corresponding chamber.

25 Claims, 11 Drawing Sheets

(56) References Cited

OTHER PUBLICATIONS

Written Opinion of the International Searching Authority, PCT/2013/030464, dated Sep. 27, 2013, 7 pages.

International Search Report for related Application No. PCT/US2013/037142 dated Jul. 26, 2013, 4 pages.

Written Opinion for related International Application No. PCT/US2013/037142 dated Jul. 26, 2013, 6 pages.

* cited by examiner

MULTI-CHAMBER PUMP SYSTEM

BACKGROUND

The present invention generally relates to apparatus for supplying lubricant, and more particularly, to a multiple chamber lubrication system for supplying different lubricants to apparatus components requiring lubrication.

Lubrication systems such as those shown in U.S. Pat. Nos. 2,187,684; 2,636,441; 2,787,225; 3,469,532; 3,502,029; 3,945,772; 4,487,340; 4,762,474; and 6,102,676, supply lubricant to apparatus components such as bearings to reduce wear, friction, heat, and noise. Such systems generally include a reservoir for holding a particular lubricant and a pump for pumping lubricant from the reservoir. Depending on factors such as surface loading and operating temperatures, different lubricants may be desirable. Currently, when different apparatus components require different lubricants, separate lubrication systems are used to deliver each lubricant. Although using separate lubrication systems is effective, multiple lubrication systems can increase cost, size, complexity, and weight. It is frequently desirable to minimize these characteristics. Thus, there is a need for lubrication systems capable of simultaneously distributing different lubricants.

SUMMARY

In one aspect, the present invention includes a lubricant reservoir, comprising a container defining an interior for holding lubricant and a partition inside the container interior dividing the interior into a plurality of chambers. Each chamber segregates lubricant from lubricant in every other chamber. The reservoir also includes a plurality of outlets. An outlet of is positioned in each chamber to permit lubricant to be removed from the corresponding chamber. In addition, the reservoir has a plurality of motor-driven stirrers. A stirrer is positioned in each chamber to stir lubricant in the corresponding chamber.

In another aspect, the present invention includes a lubrication system, comprising a base and a partitioned container mounted on the base having an interior divided into a plurality of chambers for holding lubricant. Each chamber segregates lubricant from lubricant in other chambers and has an outlet permitting lubricant to be removed from the respective chamber. Further, the system includes a plurality of pumps mounted on the base. Each of the pumps is in fluid communication with one of the chambers for pumping lubricant from the chamber through its outlet.

In yet another aspect, the present invention includes a lubricant reservoir, comprising a partitioned container mounted on the base having an interior divided into two chambers for holding lubricant. Each chamber segregates lubricant from lubricant in the other chamber and has an outlet permitting lubricant to be removed from the respective chamber. The reservoir also has a pair of stirrers. Each stirrer is positioned in a separate chamber for moving the contents of the chamber. In addition, the reservoir includes a motor operatively connected to the stirrers for moving the stirrers to stir lubricant in the chambers.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
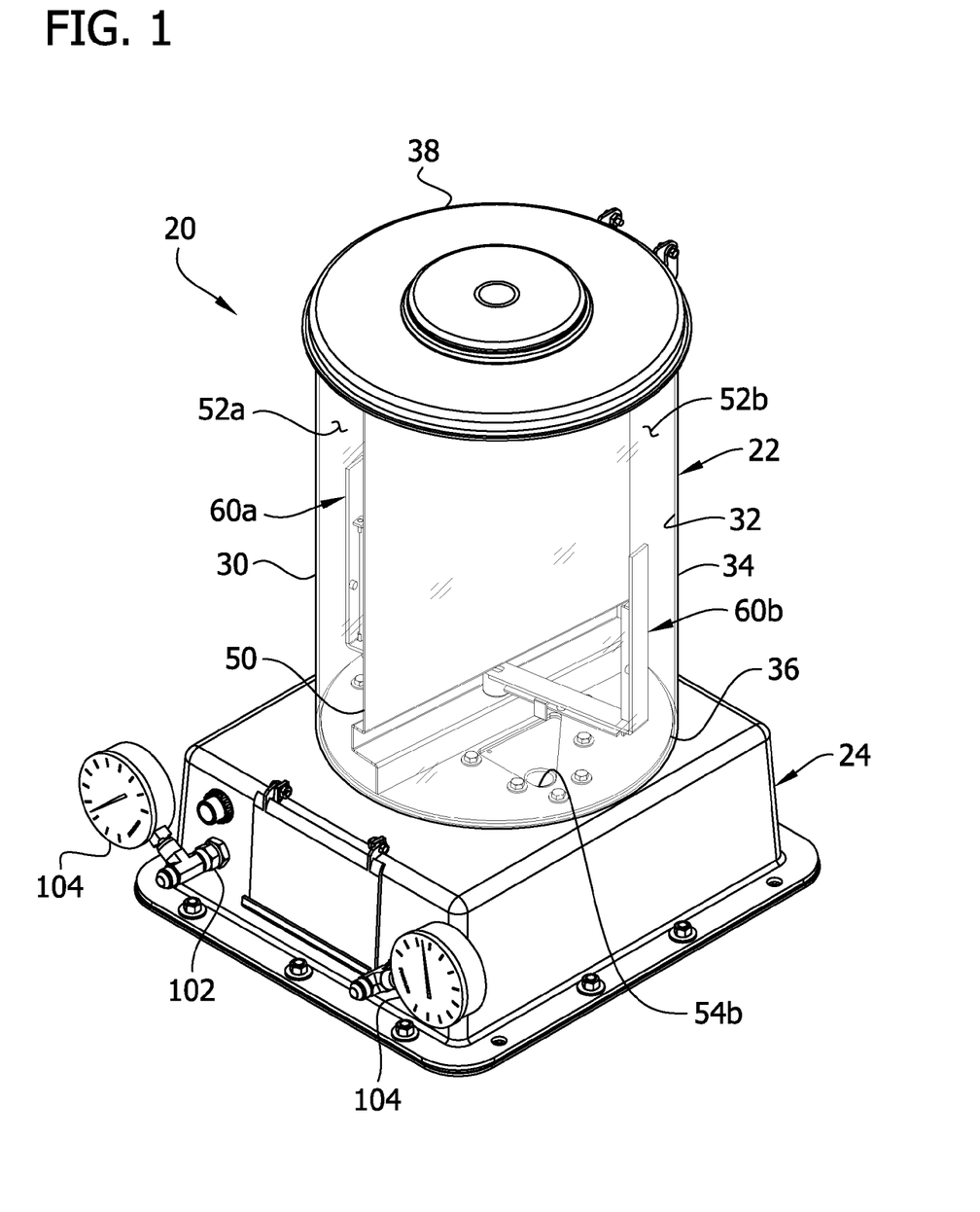
FIG. 1 is a perspective of a pump system of one embodiment of the present invention.
Figure 2:
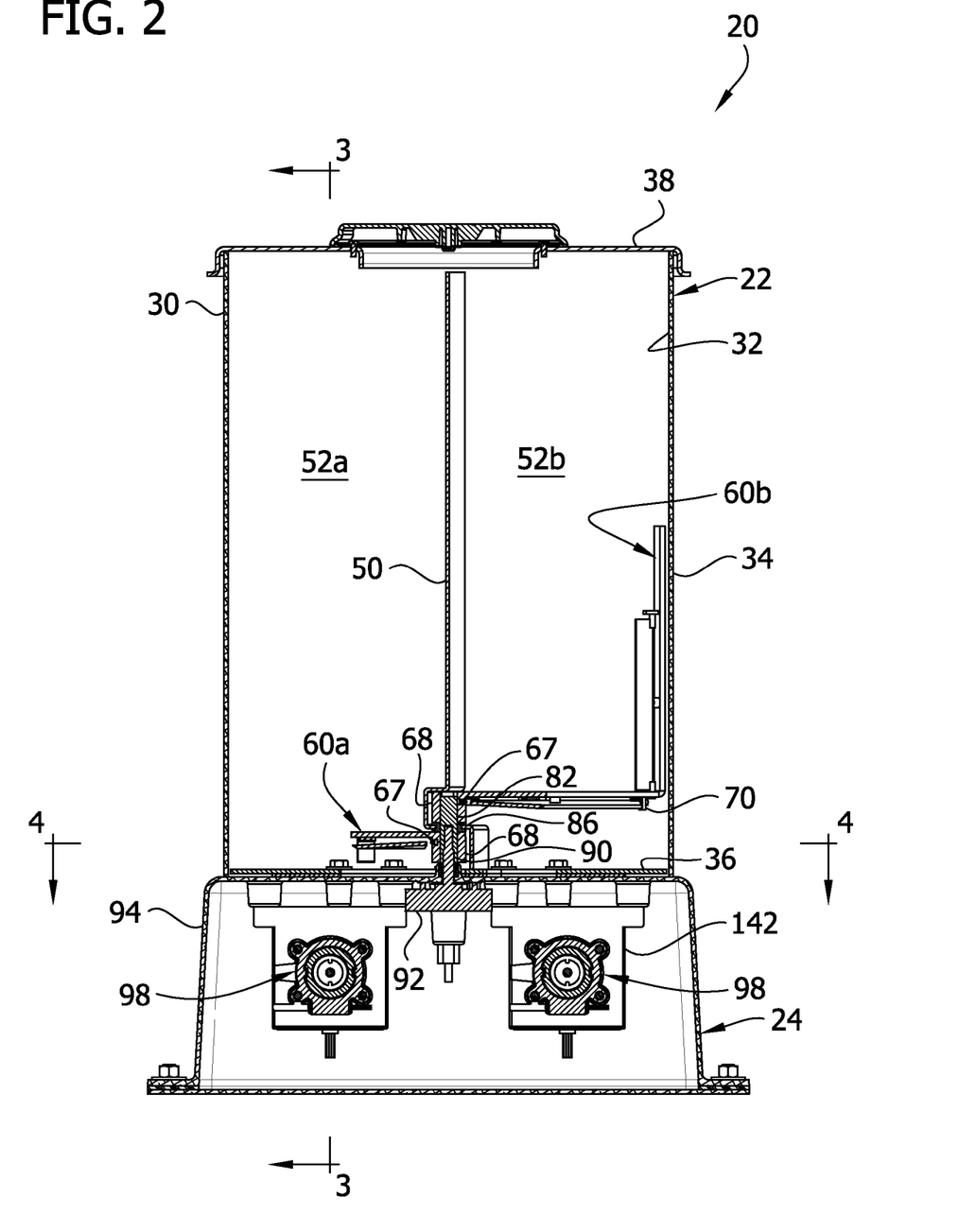
FIG. 2 is a vertical cross section of the pump system.

Referring to FIGS. 1 and 2, a lubrication system of one embodiment of the present invention is designated in its entirety by the reference number 20. The system 20 comprises a reservoir, generally designated 22, and a pump unit, generally designated 24. The reservoir 22 includes a container 30 having an interior 32 for holding lubricant. The container is formed by a cylindrical peripheral wall 34, a planar bottom wall 36, and a lid 38 pivotally attached to the peripheral wall.

Figure 3:
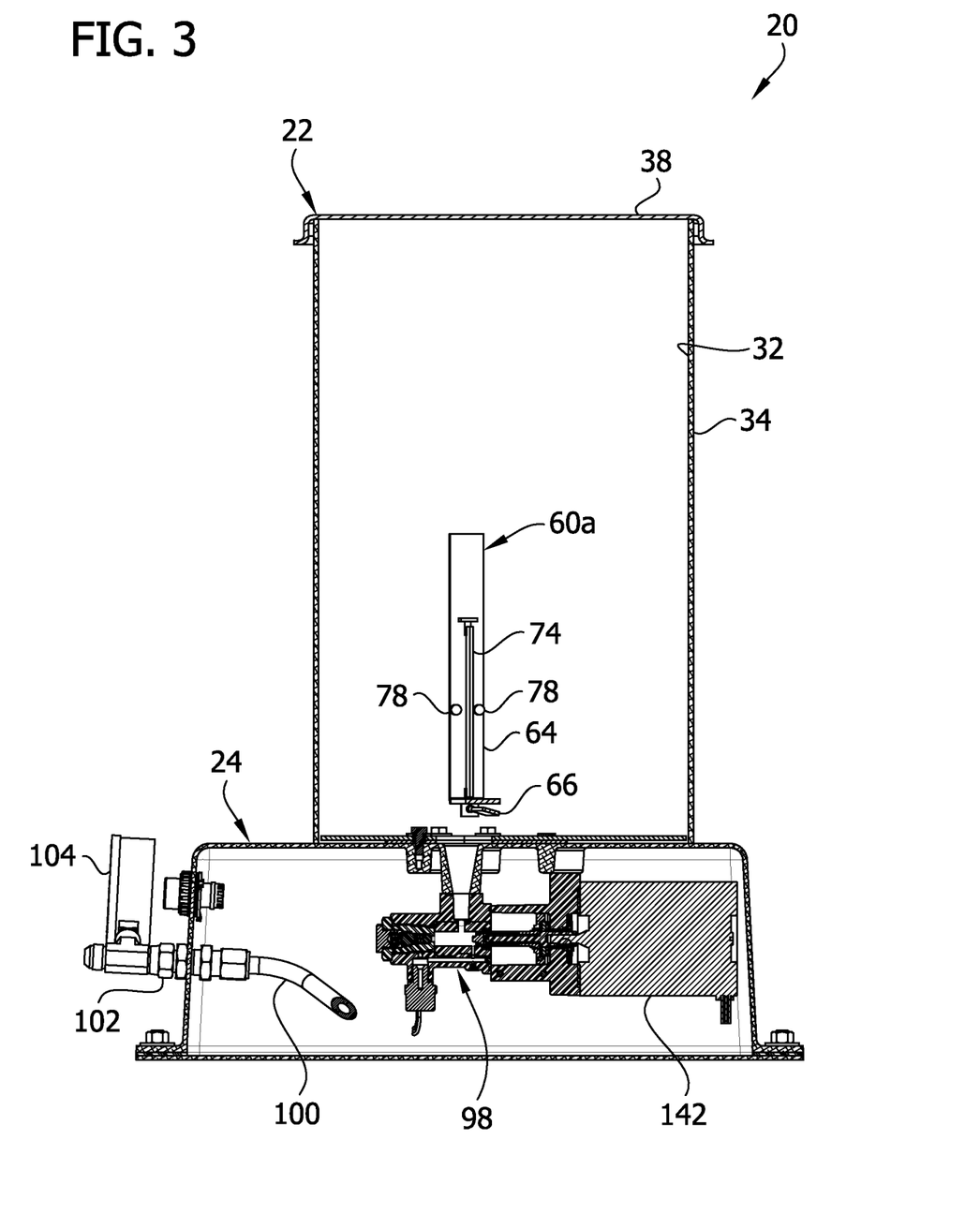
FIG. 3 is a cross section taken in a plane of line 3-3 of FIG. 2.
Figure 4:
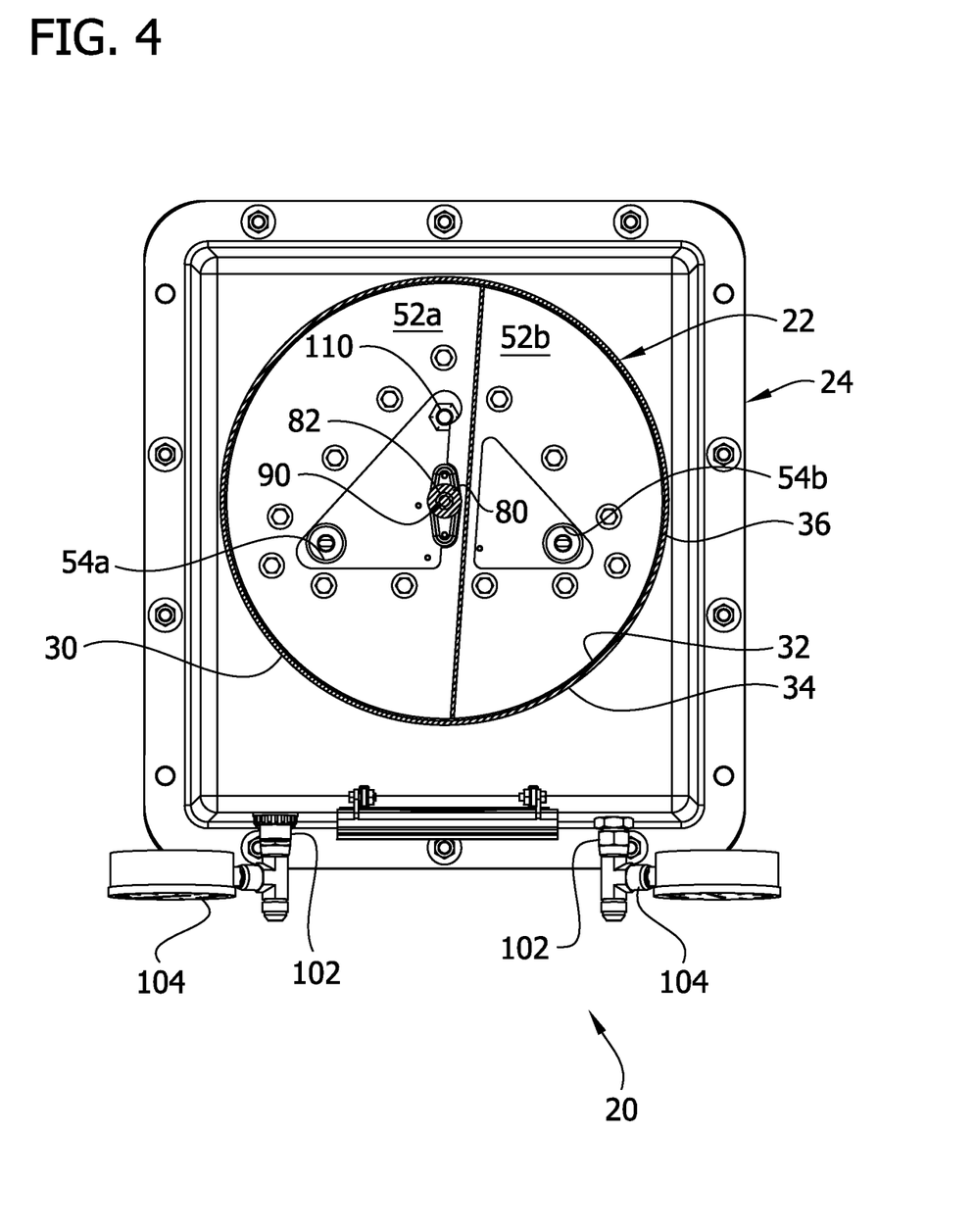
FIG. 4 is a cross section taken in a plane of line 4-4 of FIG. 2.

As further illustrated in FIGS. 1-3, the reservoir 22 also includes a planar partition 50 extending between opposing portions of the peripheral wall 34, dividing the interior into two chambers 52a, 52b. Lubricant in each chamber 52a, 52b is segregated from lubricant in the other chamber by the partition 50. Although a single panel partition 50 divides the container 30 into two chambers 52a, 52b in the illustrated embodiment, those skilled in the art will appreciate that additional partitions and/or partitions having other shapes may be used to divide the container into other numbers of chambers. As shown in FIGS. 1 and 4, an outlet 54a, 54b is provided in each chamber 52a, 52b, respectively, at the bottom wall 36 of the container 30 to allow lubricant to leave the interior 32 of the container.

Returning to FIG. 1, a stirrer, generally designated 60a, 60b, is also provided in each chamber 52a, 52b, respectively, for stirring its contents. FIGS. 1 and 5-7 illustrate that each stirrer 60a, 60b includes a horizontal arm 62 extending outward from the partition 50 adjacent the bottom wall 36 of the container 30. Extending upward from the horizontal arm 62 adjacent the peripheral wall 34 is a vertical arm 64. A deflector 66 is mounted on a lower side of the horizontal arm 62 for pivoting about a generally horizontal axis to push lubricant toward the corresponding container outlet 54a, 54b. An inboard end of each deflector 66 is pivotally received in a hole 67 in a hub 68 of the stirrer 60a, 60b, and an outboard end of each deflector is pivotally received in a hole 67 in a flange 70 mounted on the lower side of the horizontal arm 62. Stops 71 are provided on the lower side of the horizontal arm 62 to ensure the deflector 66 is always angled with respect to the bottom wall 36 so the deflector pushes lubricant as the corresponding stirrer 60a, 60b turns. As the stirrer 60a, 60b turns in one direction, drag caused by the lubricant pushes the deflector 66 so it pivots inside about its axis in the holes 67 to contact the stop 71 at the trailing edge of the arm 62. In this orientation, the deflector 66 pushes lubricant downward toward the container bottom wall 36. When the 60a, 60b stirrer turns in the opposite direction, drag caused by the lubricant pushes the deflector 66 so it pivots in the opposite direction in the holes 67 to contact the opposite stop 71 where the deflector continues to push lubricant downward toward the container bottom wall 36. A tab 72 extends downward from the lower side of the horizontal arm for activating a proximity switch as will be described below.

Figure 5:
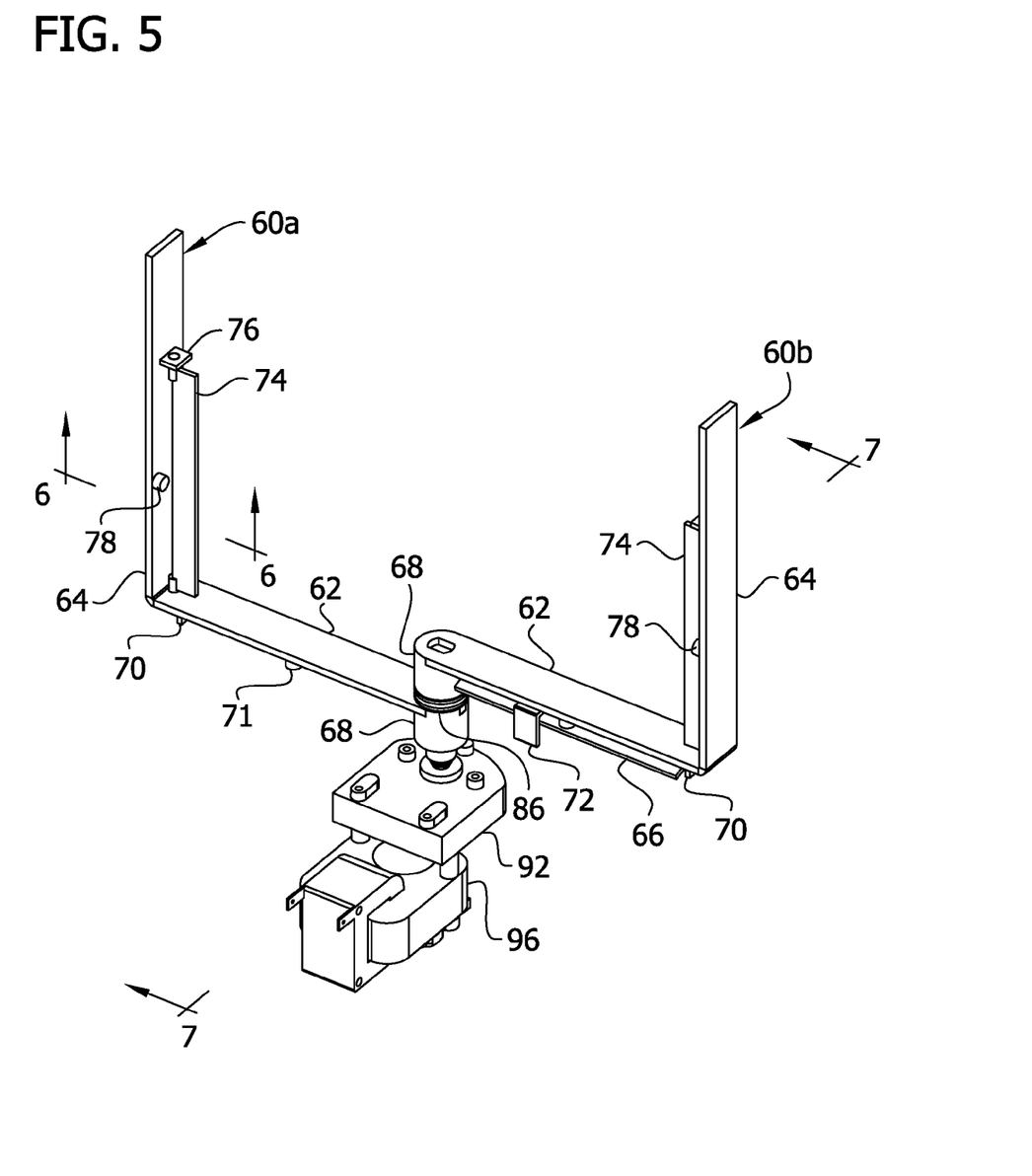
FIG. 5 is a perspective of a stirrer assembly of the pump system of FIG. 1.
Figure 6:
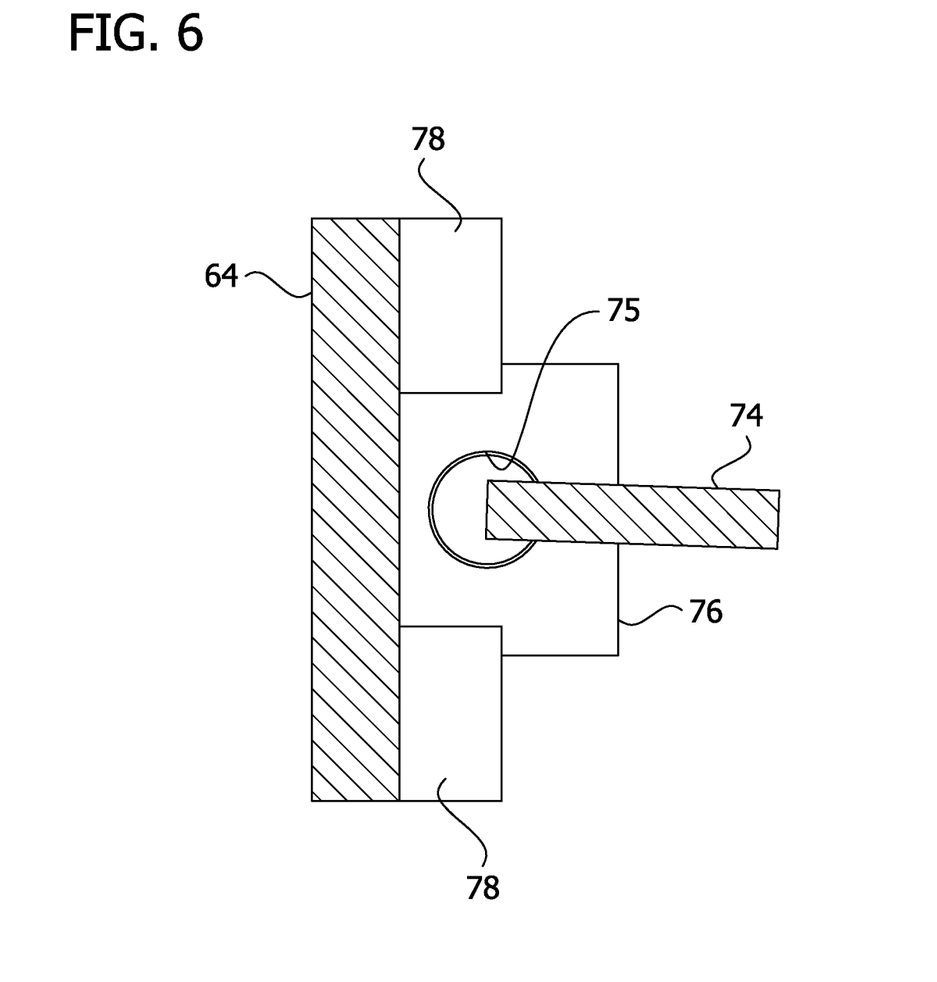
FIG. 6 is a cross section taken in a plane of line 6-6 of FIG. 5.
Figure 7:
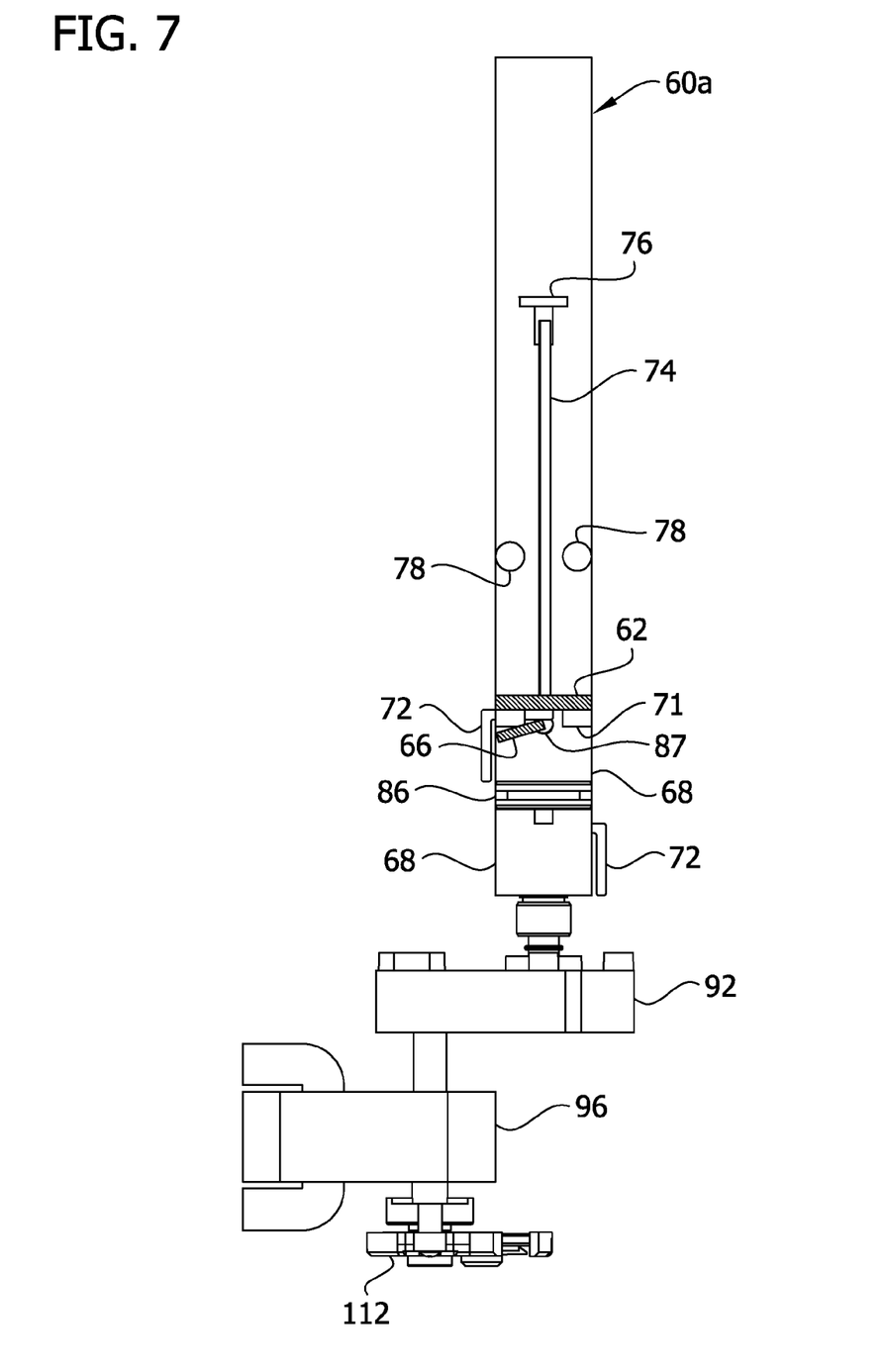
FIG. 7 is a cross section taken in a plane of line 7-7 of FIG. 5.

A vane 74 is mounted on an inward facing side of the vertical arm 64 for directing lubricant away from the peripheral wall 34 of the container 30. A lower end of each vane 74 is pivotally received in a hole 75 in the horizontal arm 62, and an upper end is received in an hole 75 in a flange 76 mounted on the inboard side of the vertical arm 64. Similarly to the horizontal arms, stops 78 are provided on the inboard sides of the vertical arms 64 to ensure the vanes 74 are angled with respect to the with respect to the peripheral wall 34 to ensure the vanes move lubricant as the corresponding stirrer 60a, 60b turns.

As further illustrated in FIGS. 2 and 3, each stirrer 60a, 60b includes a hub 68 at its inboard end. Each hub 68 is secured to a common vertical axle 82 by a set screw or other conventional means (not shown). The partition is shaped as shown in FIG. 2 to accommodate the hub of each stirrer. A grommet 86 is provided in an opening in the partition for supporting the vertical axle 82 and sealing the opening to prevent lubricant from traveling between chambers. The vertical axle 82 is mounted on a shaft 90 of a gearbox 92 mounted in a housing or base 94 of the pump unit 24. The gearbox 92 connects to a stirrer motor 96 that turns the gearbox and thus the stirrers 60a, 60b (FIG. 5). Although other motors may be used without departing from the scope present invention, in one embodiment the motor 92 is a reversible, AC, parallel shaft gearmotor available from Merkle-Korff Industries, Inc. of Des Plaines, Ill. A pump cylinder, generally designated by 98, is mounted on opposite sides of the stirrer motor.

Figure 8:
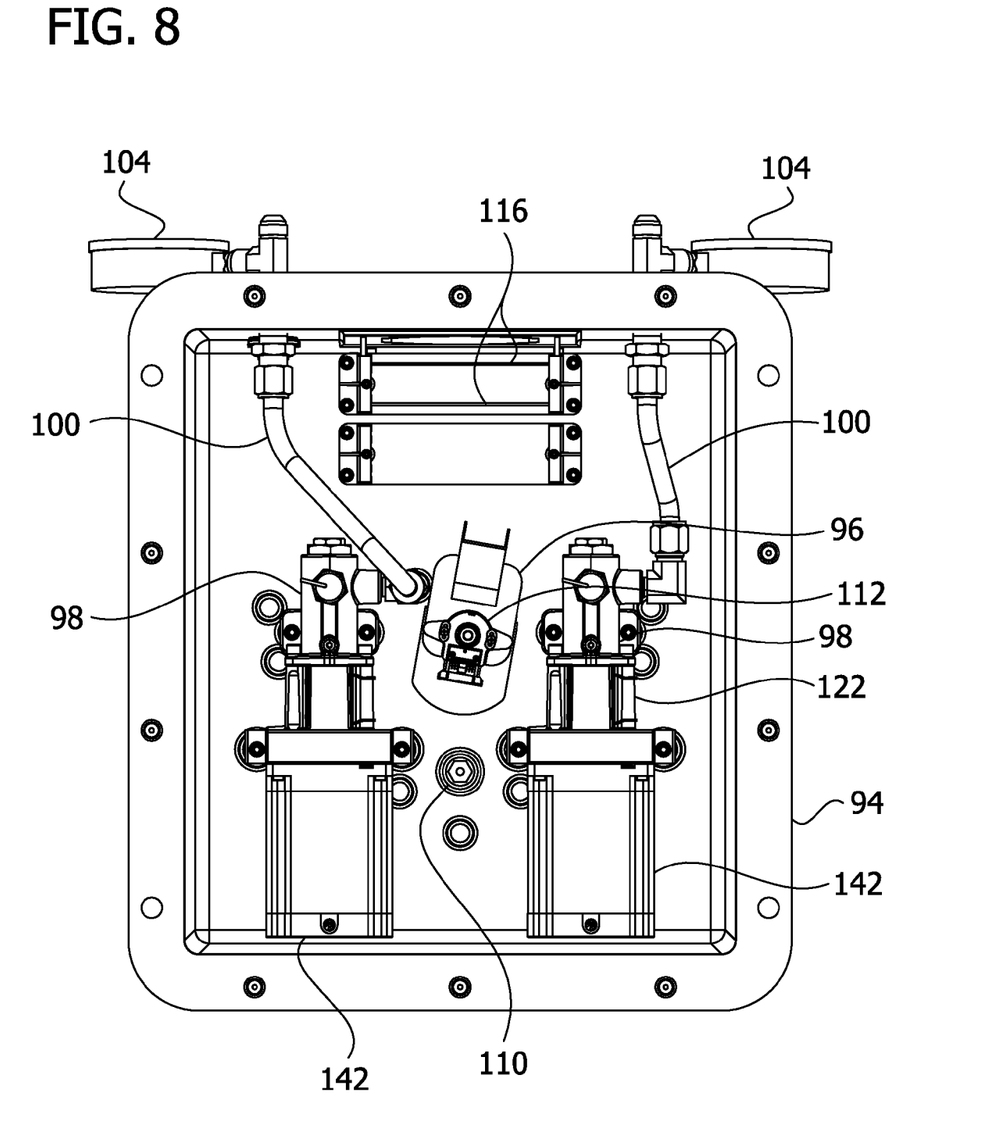
FIG. 8 is a bottom plan of the pump system.
Figure 9:
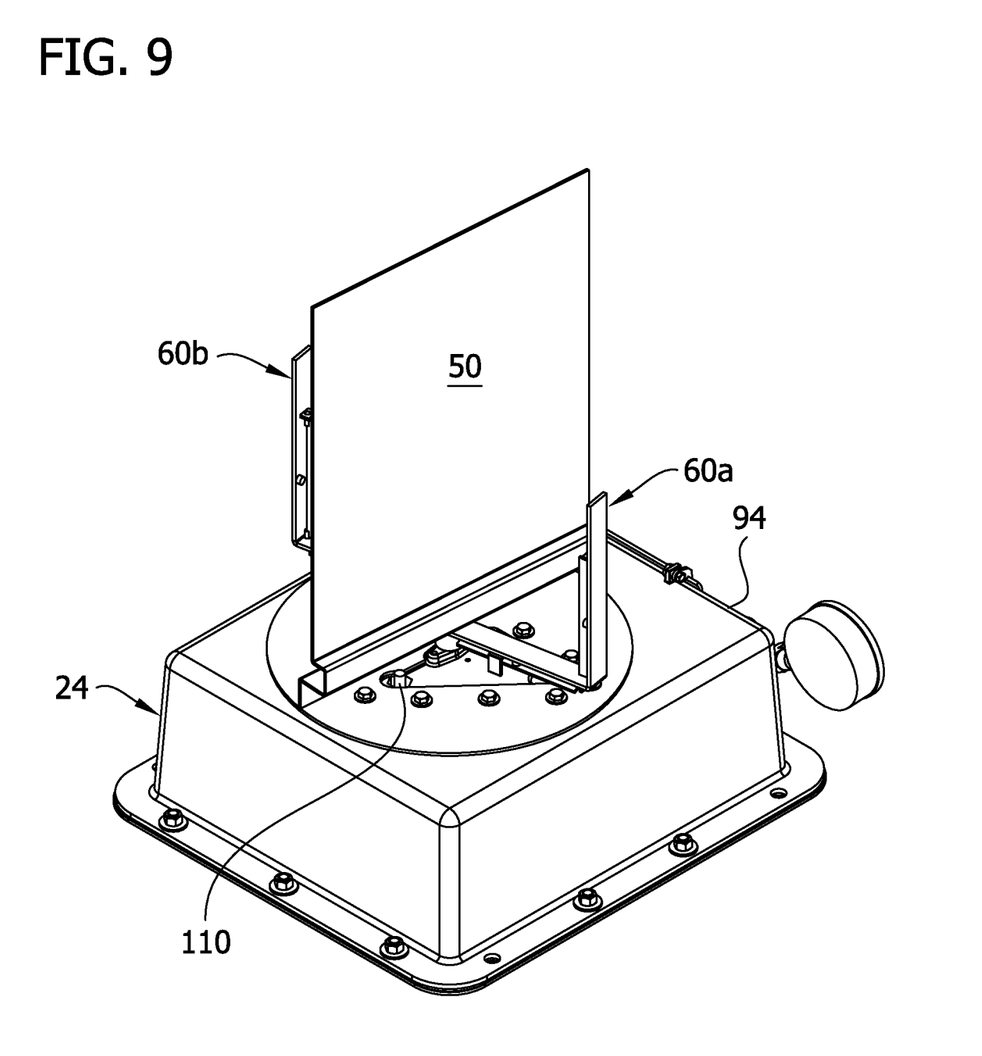
FIG. 9 is a perspective of the pump system having portions of the reservoir removed.

As shown in FIG. 8, each pump cylinder 98 pumps lubricant from the corresponding chamber 52a, 52b (FIG. 1) and pushes the lubricant through tubing 100 to an outlet coupling 102 (FIG. 1) mounted on the pump unit housing 94. A pressure indicator 104 is provided at each outlet coupling 102. Referring to FIGS. 8 and 9, a proximity switch 110 is mounted on the pump unit housing 94 so it extends through the bottom wall 36 of the container 30. The proximity switch 110 senses the presence of the tab 72 extending downward from the horizontal arm 62 of the corresponding stirrer 60a. When the presence of the tab 72 is sensed, the motor 96 is reversed to drive the stirrers 60a, 60b in the opposite direction. A position sensor 112 is mounted on the motor 92 for sensing a position of the motor rotor (not shown) corresponding to the rotational position of the stirrers 60a, 60b. When the shaft 90 turns about 180° from the position where the tab 72 is sensed by the proximity sensor 110, the position sensor 112 signals the motor 96 to reverse directions to drive the stirrers 60a, 60b in the opposite direction. Thus, the motor 96 simultaneously oscillates both stirrers 60a, 60b back and forth between opposite stirrer end positions to stir lubricant in each chamber 52a, 52b, respectively. Although a proximity switch 110 is used to control one stirrer end position and a position sensor 112 is used to control another stirrer end position, those skilled in the art will appreciate that other types of sensors and different combinations of sensors may be used without departing from the scope present invention. Circuit boards 114 are provided in the housing for controlling operation of the pump system 20, including turning the motor 96 and reversing its direction in response to signals from the proximity switch 110 and position sensor 112. It is envisioned that in some embodiments, an arc length through which the stirrers 60a, 60b rotate can be adjusted by altering the circuit boards 114, switches 110, or sensors 112.

Figure 10:
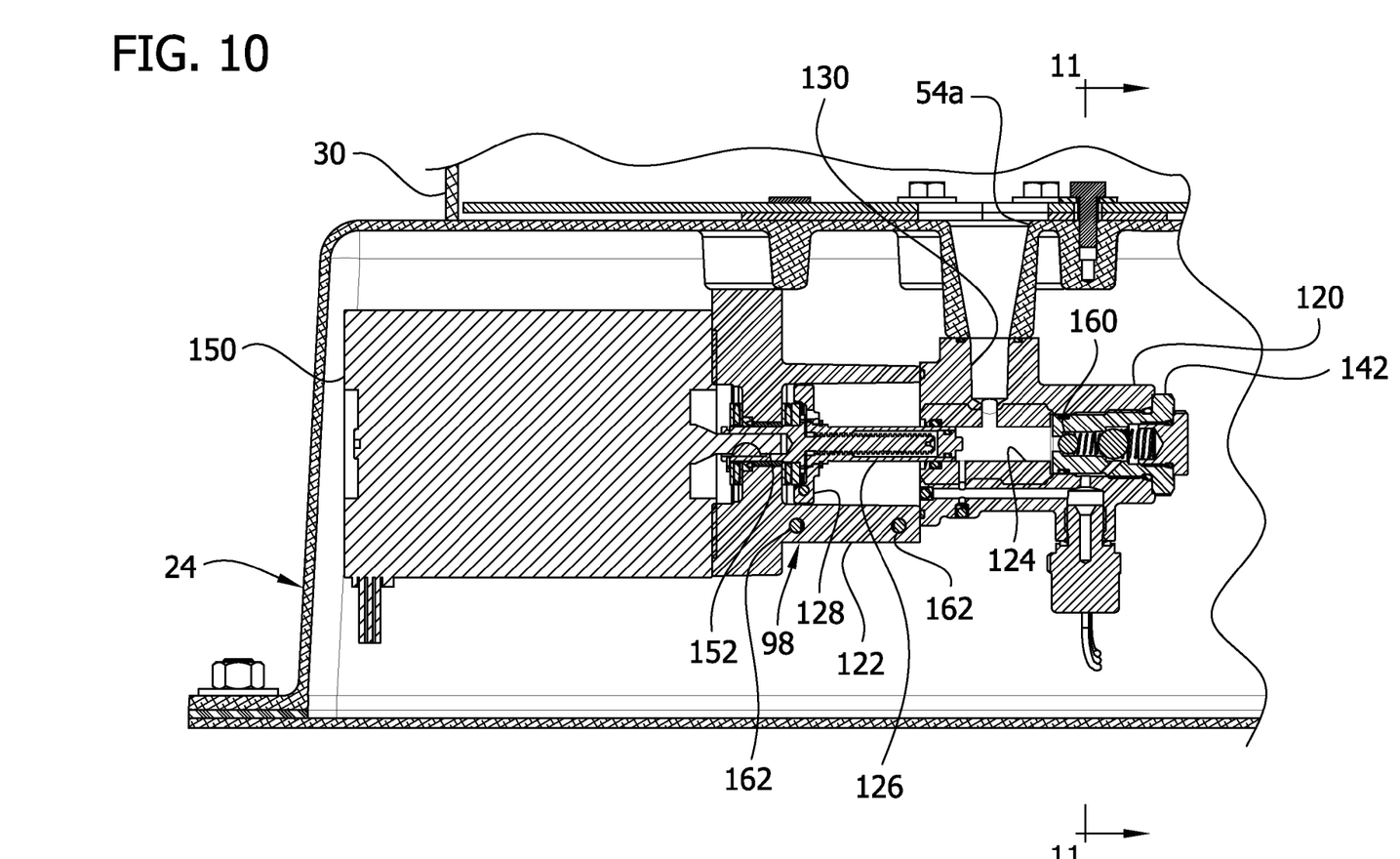
FIG. 10 is a detail of FIG. 3 showing portions of a pump unit.
Figure 11:
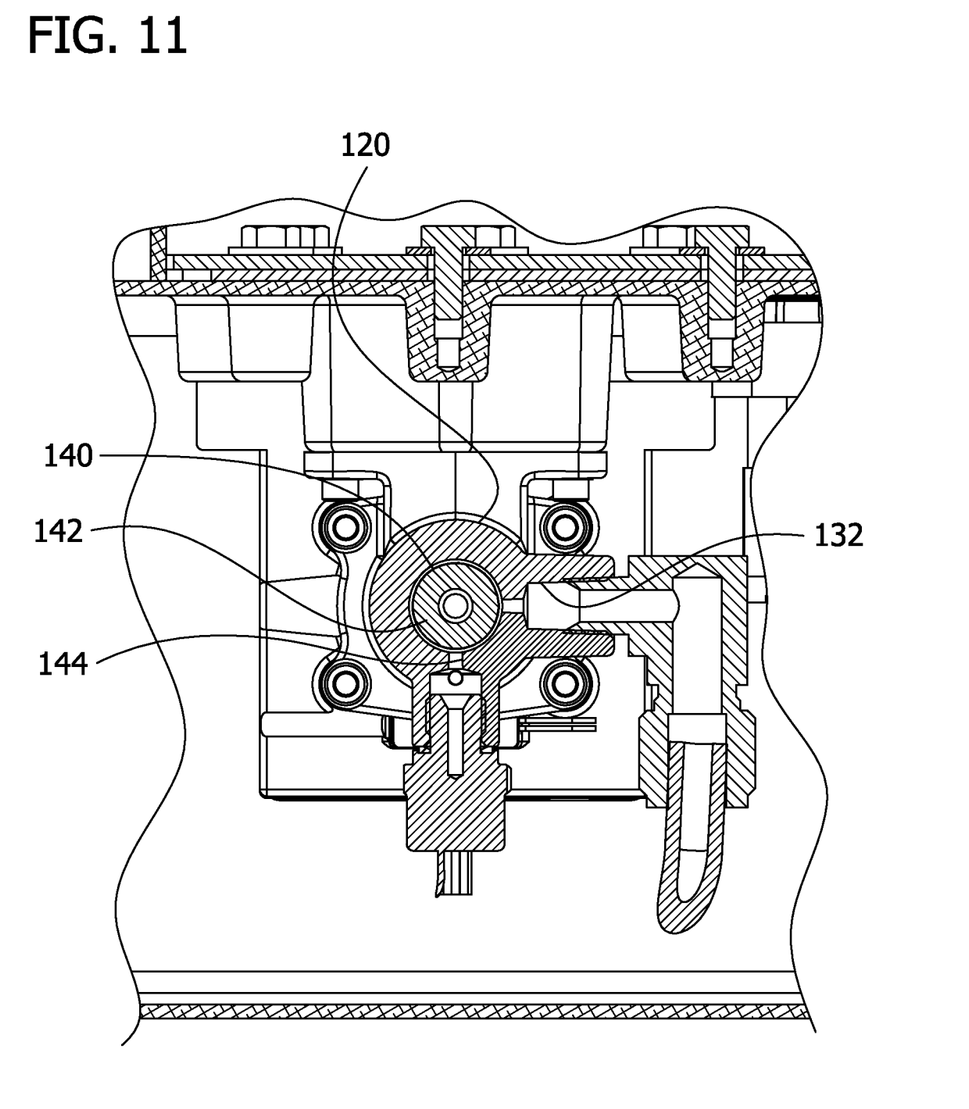
FIG. 11 is a cross section taken in a plane of line 11-11 of FIG. 10.

As illustrated in FIG. 10, each pump cylinder 98 includes a cylinder body 120 and a follower housing 122. The cylinder body 120 includes a hardened cylinder bore 124 having a piston 126 movable in the bore. The piston 126 is driven by a follower 128 in the follower housing 122 that is driven by the motor 92. The cylinder body 120 has an inlet 130 that connects the respective container outlet 54a to the cylinder bore 124. As shown in FIG. 11, an outlet 132 in the cylinder body 120 communicates with the cylinder bore 124 via an annular gap 140 located between a valve housing 142 and the cylinder body 120 for discharging lubricant at a pressure higher than lubricant at the inlet 130. FIG. 10 illustrates a reversible motor 150 having a shaft 152 connected to the follower 128. As the motor 150 turns the shaft 152 first in one direction and then in an opposite direction, the follower 128 reciprocates, driving the piston 126 back and forth in the cylinder bore 124. Although other motors may be used without departing from the scope present invention, in one embodiment the motor 150 is a stepper motor, model 34Y2 motor available from Anaheim Automation, Inc. of Anaheim, Calif. A spring loaded check valve 160 is provided between the cylinder bore 124 and the outlet 132 for controlling a direction of lubricant flow through the pump cylinder 98. Position sensors 162 are provided in the follower housing 122 for sensing the position of the follower 128 (and thus the piston 126) in relation to the follower housing. Both the position sensors 162 and the motors 150 are operatively connected to the circuit boards 116 (FIG. 8) for controlling operation of the motors 150 in response to signals from the position sensors. Although those skilled in the art will understand the operation and structure of the cylinder body 120 described above, further details and alternatives can be found in U.S. patent application Ser. No. 13/271,814, which is incorporated by reference.

In use, the chambers 52a, 52b are filled with the same or different lubricants selected for a particular application by raising the lid 38. The circuit boards 116 signal the stirrer motor 96 to turn the stirrers 60a, 60b back and forth in the chambers 52a, 52b, respectively, as explained previously. As the stirrers rotate, the vanes 74 pivot to direct lubricant away from the peripheral wall 34 of the container 30 and the deflectors 66 pivot to push lubricant toward outlets 54a, 54b in the bottom wall 36 of the container. When lubricant is needed, the circuit board 116 signal the appropriate motor 150 to reciprocate the corresponding piston 126 back and forth in the cylinder bore 124. As the piston 126 moves toward the motor 150, lubricant is drawn into the cylinder bore 124 from the corresponding chamber through the inlet 130. When the position sensor 162 senses an end of the stroke, the circuit board 116 signals the motor 150 to reverse, driving the piston 126 away from the motor. When the piston 126 passes the inlet 130, pressure builds in the cylinder bore 124, opening the check valve 160 in the valve housing 142. With the check valve 160 open, lubricant passes through the annular gap 140 and outlet 132 to the tubing 100 and on to the coupling 102.

Other linear position drive mechanisms can be used to reciprocate the piston 126 in the cylinder bore 124.

As will be appreciated by those skilled in the art, the embodiment described above permits different lubricants to be dispensed using only one pump system 20.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A lubricant reservoir, comprising:
    a container defining an interior for holding lubricant;
    a partition inside the container interior dividing the interior into a plurality of chambers, each chamber of said plurality of chambers segregating lubricant from lubricant in every other chamber of said plurality of chambers;
    a plurality of outlets, an outlet of said plurality of outlets being positioned in each chamber of said plurality of chambers to permit lubricant to be removed from the corresponding chamber; and
    a plurality of motor-driven stirrers, a stirrer of said plurality of stirrers being positioned in each chamber of said plurality of chambers to stir lubricant in the corresponding chamber.

2. A lubricant reservoir as set forth in claim 1 wherein the partition consists of a single panel dividing the container interior into two chambers.

3. A lubricant reservoir as set forth in claim 2, wherein the plurality of stirrers consists of two stirrers.

4. A lubricant reservoir as set forth in claim 3, wherein a single motor is operatively connected to both stirrers for moving the stirrers to stir lubricant in both chambers.

5. A lubricant reservoir as set forth in claim 4, wherein the motor simultaneously moves both stirrers.

6. A lubricant reservoir as set forth in claim 4, wherein the motor oscillates the stirrers.

7. A lubricant reservoir as set forth in claim 6, wherein the stirrers oscillate between opposite stirrer reversing positions.

8. A lubricant reservoir as set forth in claim 7, wherein at least one of said stirrer reversing positions is controlled by a proximity switch.

9. A lubricant reservoir as set forth in claim 7, wherein at least one of said stirrer reversing positions is controlled by a position sensor.

10. A lubricant reservoir as set forth in claim 9, wherein one of said stirrer reversing positions is controlled by a proximity switch.

11. A lubricant reservoir as set forth in claim 6, wherein each stirrer of said plurality of stirrers comprises:
    a horizontal arm extending adjacent a bottom wall of the container from adjacent the partition to adjacent the peripheral wall of the container; and
    a vertical arm extending upward adjacent the peripheral wall from the horizontal arm.

12. A lubricant reservoir as set forth in claim 11, wherein each stirrer of said plurality of stirrers further comprises a deflector pivotally mounted on a lower side of the horizontal arm for pushing lubricant toward the container outlet.

13. A lubricant reservoir as set forth in claim 12, wherein:
    each stirrer of said plurality of stirrers oscillates back and forth in opposite directions; and
    each of said deflectors pivots back and forth in opposite directions in response to the corresponding stirrer changing direction as the stirrer oscillates.

14. A lubricant reservoir as set forth in claim 11, wherein each stirrer of said plurality of stirrers further comprises a vane pivotally mounted to an inward facing side of the vertical arm for directing lubricant away from the peripheral wall.

15. A lubricant reservoir as set forth in claim 14, wherein:
    each stirrer of said plurality of stirrers oscillates back and forth in opposite directions; and
    each of said vanes pivots back and forth in opposite directions in response to the corresponding stirrer changing direction as the stirrer oscillates.

16. A lubrication system, comprising:
    a base;
    a partitioned container mounted on the base having an interior divided into a plurality of chambers for holding lubricant, each chamber of said plurality of chambers segregating lubricant from lubricant in other chambers of said plurality of chambers and having an outlet permitting lubricant to be removed from the respective chamber;
    a plurality of pumps mounted on the base, each of said pumps being in fluid communication with one of said chambers for pumping lubricant from the chamber through its outlet;
    a plurality of stirrers, each stirrer of said plurality of stirrers being positioned in a separate chamber of said plurality of chambers; and
    a motor operatively connected to at least one stirrer of said plurality of said stirrers for moving the stirrer to stir lubricant in the corresponding chamber.

17. A lubricant reservoir, comprising:
    a partitioned container having an interior divided into two chambers for holding lubricant, each chamber segregating lubricant from lubricant in the other chamber and having an outlet permitting lubricant to be removed from the respective chamber;
    a pair of stirrers, each stirrer being positioned in a separate chamber for moving the contents of said chamber; and
    a motor operatively connected to said stirrers for moving the stirrers to stir lubricant in the chambers.

18. A lubricant reservoir as set forth in claim 17, wherein the motor is operatively connected to both stirrers for simultaneously oscillating both stirrers to stir lubricant in each of the chambers, each of said stirrers oscillating between opposite stirrer end positions.

19. A lubricant reservoir as set forth in claim 18, wherein at least one of said stirrer end positions is controlled by a proximity switch.

20. A lubricant reservoir as set forth in claim 18, wherein at least one of said stirrer end positions is controlled by a position sensor.

21. A lubricant reservoir as set forth in claim 20, wherein one of said stirrer end positions is controlled by a proximity switch.

22. A lubricant reservoir as set forth in claim 17, wherein each stirrer comprises:
    a horizontal arm extending adjacent a bottom wall of the container from adjacent the partition to adjacent a peripheral wall of the container; and
    a vertical arm extending upward adjacent the peripheral wall from the horizontal arm.

23. A lubricant reservoir as set forth in claim 22, wherein each stirrer further comprises a deflector pivotally mounted to a lower side of the horizontal arm for pushing lubricant toward the container outlet.

24. A lubricant reservoir as set forth in claim 22, wherein each stirrer further comprises a vane pivotally mounted to an inward facing side of the vertical arm for directing lubricant away from the peripheral wall.

25. A lubricant reservoir as set forth in claim 17, wherein the container comprises:
   a cylindrical peripheral wall; and
   a planar partition extending across the container between opposite portions of the cylindrical peripheral wall dividing the container into said chambers.

\* \* \* \* \*